United States Patent [19]

Pitcher, Jr.

[11] 4,329,162

[45] May 11, 1982

[54] DIESEL PARTICULATE TRAP

[75] Inventor: Wayne H. Pitcher, Jr., Big Flats, N.Y.

[73] Assignee: Corning Glass Works, Corning, N.Y.

[21] Appl. No.: 165,391

[22] Filed: Jul. 3, 1980

[51] Int. Cl.³ .................. B01D 39/20; C04B 21/06
[52] U.S. Cl. ........................ 55/523; 55/DIG. 30; 210/510; 60/311
[58] Field of Search ............... 55/523, DIG. 30; 210/510; 60/295, 299, 311; 252/477 R; 106/40 R, 40 V, 41, 62; 428/73, 116–118, 411; 422/180; 75/20 F, 68 R, 69, 93 R; 165/8

[56] References Cited

U.S. PATENT DOCUMENTS

| 3,739,553 | 6/1973 | Aine | 55/DIG. 30 |
|---|---|---|---|
| 3,785,781 | 1/1974 | Hervert et al. | 422/171 |
| 4,264,346 | 4/1981 | Mann | 55/DIG. 30 |
| 4,276,071 | 6/1981 | Outland | 55/523 |

OTHER PUBLICATIONS

Poe et al., USEPA Report EPA-600/2-77-056, Feb. 1977, pp. 20 and 27.

Cercor ® Cellular Ceramics Product Bulletin NPC-2, Corning Glass Works, 1961, pp. 5–6.
CELCOR ® Cellular Ceramics Product Bulletin, Corning Glass Works, 1977, pp. 2–5.

Primary Examiner—David L. Lacey
Attorney, Agent, or Firm—Richard N. Wardell

[57] ABSTRACT

Apparatus for filtering solid particulates from suspension in fluid streams (especially carbon particulates from exhaust gas of diesel engines) comprising a honeycomb filter with thin porous walls defining cells extending therethrough, with the transverse cross-sectional shapes of the cells forming a repeating pattern of geometric shapes without interior corner angles of less than 30° and with alternate cells forming an inlet group and an outlet group. The inlet group is open at the inlet face and closed adjacent the outlet face. The outlet group is closed adjacent the inlet face and open at the outlet face. Each cell of each group shares cell walls only with cells of the other group. The walls have a volume of substantially uniform interconnected open porosity and a mean pore diameter of the pores forming the open porosity lying within the area defined by the boundary lines connecting points 1-2-3-4 in FIG. 4.

19 Claims, 4 Drawing Figures

DIESEL PARTICULATE TRAP

RELATED APPLICATION

This application describes and claims an improved species of the invention by Rodney I. Frost and Irwin M. Lachman described and claimed in their copending application Ser. No. 165,646 entitled FILTER AND RELATED APPARATUS, which was filed on the same date as this application and is assigned to the assignee of this application.

BACKGROUND OF THE INVENTION

Removal of solid particulates from fluids—gases and/or liquids—in which the particulates are suspended is commonly done by use of filters. Generally filters are made of porous solid materials in the form of articles or masses with a plurality of pores extending therethrough (which may be interconnected) and having small cross-sectional size or minimum diameter such that the filters are: (1) permeable to the fluids, which flow through the filters from their inlet surface to their outlet surface, and (2) capable of restraining most or all of the particulates, as desired, from passing completely through the filters with the fluid. Such pores constitute what is termed "open porosity" or "accessible porosity". The restrained particulates are collected on the inlet surface and/or within the pores of the filter while the fluids continue to pass through those collected particulates and the filter. The minimum cross-sectional size of each of some or all of the pores can be larger than the size of some or all of the particulates, but only to the extent that significant or desired amounts of the particulates become restrained or collected on and/or within the filters during filtration of the fluids flowing through the filters. As the mass of collected particulates increases, the flow rate of the fluid through the filter usually decreases to an undesirable level. At that point, the filter is either discarded as a disposable/replaceable element or regenerated by suitably removing the collected particles off and/or out of the filter so that it can be reused.

Four general main considerations for useful filters are:

(1) filter efficiency: the amount of suspended particulates of concern in a given volume of fluid that are removed from that volume of fluid as it passes through the filter (usually expressed as a weight percentage of the total particulates of concern originally in that given volume of fluid prior to passing into the filter);

(2) flow rate: the volume of the fluid per unit of time that passes through the filter and collected particulates or, in a closed continuous feed system, the back pressure or increased pressure created in such system upstream from the filter by the presence of the filter and particulate collected thereon in comparison to what the pressure therein would have been in the absence of the filter;

(3) continuous operating time: the cummulative time of continued service of the filter before filter efficiency and/or flow rate/back pressure become unacceptable so as to necessitate replacement and/or regeneration of the filter; and (4) compact structure: smallest space-saving volume and configuration of the filter for attaining the best combination of filter efficiency, flow rate/back pressure nd continuous operating time.

For filtration of fluids at elevated temperatures, consideration must also be given to the filters having adequate mechanical and chemical durability under the prevailing conditions of temperature within the filter and chemical reactivity of the fluids and suspended particulates coming into contact with the filter.

The considerations noted above, especially the four general main ones, appear to be accommodated in varying degrees, but in less than fully satisfactory ways, by the following examples of prior art filters or incomplete filter suggestions:

U.S. Pat. Nos. 2,884,091, 2,952,333 and 3,242,649 illustrate filters of the type made of pleated thin porous sheets of filter material whose layers are interleaved with corrugated or crimped spacers with the parallel corrugations or crimps thereof extending substantially perpendicular to the folds of the pleated sheets. In essence, fluid enters a complete layer or column of cells defined by a spacer and then passes through only the filter sheets on each side thereof (but not through corrugation or crimp segments of a spacer separating adjacent cells in that spacer) to effect filtration. Moreover, the corrugations involve cell-like passages whose transverse cross-sections have sinusoidal geometric shapes having small angle "corners" of substantially less than 30°.

British patent specification No. 848,129 shows another form of the pleated-type filters wherein, instead of being interleaved with corrugated spacers, the thin porous sheets of filter material are impressed with spacer dimples to maintain spacing between the pleats.

U.S. Pat. No. 3,346,121 discloses thin-porous-walled honeycomb filters of corrugated layer structure having crosswise oppositely indented portions that block end portions of the channels or passages in an alternating pattern within each layer (but not necessarily from layer to layer) to cause fluid therein to pass through the porous walls to effect filtration of the fluid. The corrugation pattern is such that the channels or cells have transverse, cross-sectional, geometric shapes with numerous instances of corners formed by small angles substantially less than 30°. Moreover, the layered structure involves numerous portions, where the layers adjoin each other, which are of double and sometimes triple layer or wall thickness.

U.S. Pat. No. 3,533,753 describes catalyst bodies with layered networks of intersecting "capillary" channels which can function as a filter body for combustion exhaust gas dust or sedimented particles, which can be diesel engine exhaust soot or particulates as noted in U.S. Pat. No. 4,054,417.

U.S. Pat. No. 3,637,353 discloses a tubular packed bed of granular catalyst with fluid-flow interstices for filtering particulates from exhaust gases generated by diesel engines.

U.S. Pat. No. 4,054,417 also suggests making the disclosed diesel exhaust filters of known materials used in heat exchangers for turbine engines or in monolith catalytic converters for automotive vehicles (e.g. as disclosed in U.S. Pat. No. 3,122,184 as a corrugated structure and in U.S. Pat. No. 3,790,654 as an extruded structure) as alternatives to and in a manner similar to the material in U.S. Pat. No. 3,533,753 (i.e. with fluid flow passing into, through and out of every channel).

Research report EPA-600/2-77-056 of the U.S. Environmental Protection Agency suggests that several commercially available thin-porous-walled ceramic monoliths of honeycomb appearance, both corrugated and extruded, are potential filters for diesel exhaust particulates. However, the only illustrated arrangement given therefor is the alternate layer cross-flow design of a corrugated monolith, with small corners less than 30° in transverse cross section, wherein the exhaust gas passes through only those thin walls between layers of cells or passages. This report also suggests the suitability of porous bonded masses of ceramic fibers for filters of diesel exhaust particulates.

British patent specification No. 1,440,184 discloses that porous bonded sheets of refractory metal oxide fibers can be formed into corrugated or embossed honeycomb structures for use in filtration of hot waste gases containing particulate matter and of molten metal prior to casting. As in cases noted above, the transverse cross-section of the corrugated embossed or structures contain numerous small angle corners much less than 30°.

U.S. Pat. Nos. 4,041,591 and 4,041,592 disclose thin-walled, honeycombed, multiple-fluid-flow-path bodies with all cells or passages parallel such that fluid entering each of the passages can continue through and pass out of the open exit end thereof without passing through any cell wall. Alternate selected columns or layers of cells have their ends sealed for advantageous separate manifolding to fluid conduits. An optional use indicated for these bodies is in filtration and osmosis when porous materials are used to form the honeycombed body so that some of the fluid flowing in a first set of cells can pass into an adjacent alternate set of cells through the thin porous walls between them while a remaining portion of the fluid with a higher concentration of an undesirable or separable constituent can continue through and pass out of the open exit end of the first sets of cells. Examples of the latter use are reverse osmosis filtration and ultrafiltration of saline or impure water to produce potable or purified water, in which cases the surfaces of the porous walls defining the first set of cells are lined with suitable selectively permeable membranes.

SUMMARY OF THE INVENTION

A new filter body has now been conceived for removing solid particulates from suspension in fluids, such as exhaust gas from diesel engines, and which is believed to provide a superior combination of satisfaction, especially with regard to the main considerations of filter efficiency and continuous operating time noted above. When fabricated of inorganic (especially ceramic) material having incipient melting point above the elevated temperature of fluids to be filtered, the superior combination of satisfaction includes regard for adequate mechanical and chemical durability under the prevailing filtration conditions with such hot fluids.

The new filter body of this invention is a novel improvement in the earlier filter body, claimed in the aforesaid related copending application, based on a thin-porous-walled honeycomb structure with its cells or passages being mutually parallel and extending longitudinally therethrough between inlet and outlet end faces. Such filter body is characterized by the entirety of all cell walls constituting effective filters directly between adjacent inlet and outlet cells such that there are no small angle (<30°) corners in the transverse cross-sectional geometric shapes of the cells that inhibit full effective access to such filters by the fluid due to fluid flow patterns and particulate accumulation patterns effected by such shapes with small angle corners. When viewed from each of the inlet and outlet end faces of the filter, alternate groups of cell ends are open and closed in a checkered or checkerboard pattern, with the outlet end face pattern being the opposite of the inlet end face pattern. Such filter body comprises a honeycomb structure having a matrix of thin porous walls defining a plurality of cells extending longitudinally and mutually parallel therethrough between inlet and outlet end faces of the structure. Generally, the walls are not greater than about 1.5 mm (preferably maximum of about 0.635 mm) thick. The walls contain substantially uniform randomly interconnected open porosity of a volume and size sufficient to enable the fluid to flow completely through the walls and to restrain most or all of the particulates from passing completely through the walls. The transverse cross-sectional shapes of the cells form a substantially uniformly repeating pattern of geometric shapes without interior angles of less than 30° (preferably less than 45°). The inlet group of the cells is open at the inlet end face and closed adjacent to the outlet end face. The outlet group of the cells is closed to adjacent the inlet end face and open at the outlet end face. Each cell of the inlet group shares cell walls only with cells of the outlet group. Each cell of the outlet group shares cell walls only with cells of the inlet group.

According to the present invention, the volume of interconnected open porosity in the walls and the mean pore diameter of the pores forming the open porosity lie uniquely within the area defined by the boundary line connecting points 1-2-3-4 in FIG. 4 (and preferably connecting points 1-5-6-4 in the same figure). Such porosity and pore diameters are determined by conventional mercury-intrusion porosimetry.

The walls within each of a plurality of transverse sectors (e.g. annular or pie/wedge shaped) of the structure or throughout the structure should beneficially have substantially uniform thickness for substantially uniform filtration within the entirety respectively of such sectors or whole structure to maximize continuous operating time.

Transverse cross-sectional cell density within the structure should be generally at least about 1.5 cells/cm$^2$ (preferably at least about 7.75 cells/cm$^2$) for maximizing filter surface area within a compact structure.

DETAILED DESCRIPTION

Figure 1:
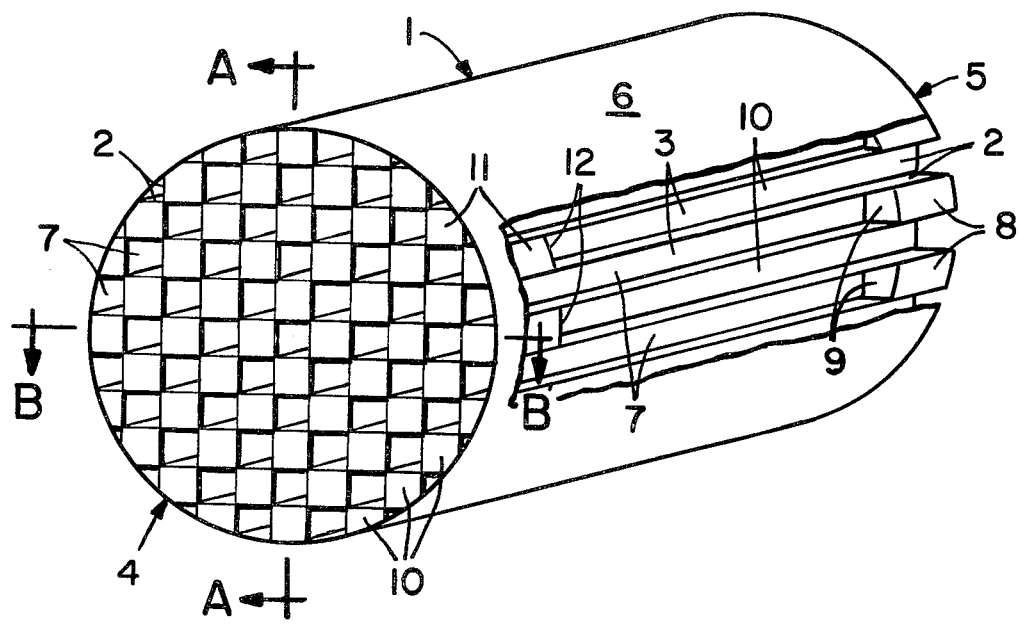
FIG. 1 is a partially broken away, oblique view of a preferred embodiment of a filter body according to the present invention.

The filter body 1 shown in FIG. 1 comprises a cellular or honeycomb structure (monolith) which has a matrix of intersecting, uniformly thin walls 2 defining a plurality of cells 3. The cells 3 extend longitudinally and mutually parallel through the body 1 between the inlet end face 4 and the outlet end face 5. Ordinarily the body 1 also has a peripheral wall or skin 6. An inlet group of alternate cells 7 are open at the inlet end face 4 and are closed, sealed or plugged with closure means 8 adjacent outlet end face 5. Means 8 can be a sealant or cement mass adhering to walls 2 and extending from face 5 a short distance inwardly to end face 9 of means 8. The other alternate cells 10 form an outlet group and are open at outlet end face 5, but they are similarly closed adjacent inlet end face 4 by closure means 11, which likewise extend inwardly a short distance from face 4 to end face 12 of means 11. Thus, as viewed at end faces 4 and 5, the alternating open and closed cells are in a checkered or checkerboard pattern.

Body 1, including means 8 and 11, can be made of any suitable materials such that walls 2 have the requisite interconnected open porosity therein and means 8,11 are generally impermeable to fluids. Such materials may include ceramics (generally crystalline), glass-ceramics, glasses, metals, cermets, resins or organic polymers, papers or textile fabrics (with or without fillers), etc. and combinations thereof. For walls 2 and skin 6, it is preferred to fabricate them from plastically formable and sinterable finely divided particles and/or short length fibers of substances that yield a porous sintered material after being fired to effect sintering thereof, especially ceramics, glass-ceramics, glasses, metals and/or cermets. As desired (besides volatizable plasticizers/binders for the formable particle batch or mixture), any suitable or conventional fugitive or combustible (burn-out) additive can be dispersed within the formable and sinterable mixture so as to provide appropriate and adequate open porosity in the sintered material of walls 2. Moreover, the requisite open porosity can also be designed into walls 2 by raw material selection as described in U.S. Pat. No. 3,950,175.

The body 1 can be fabricated by any suitable technique. It (without plugs 8 and 11) is made preferably by extrusion of a sinterable mixture in the manner as disclosed in U.S. Pat. Nos. 3,790,654, 3,919,384 and 4,008,033. Such extruded green honeycomb body is then fired for effecting the sintered condition thereof in the manner as disclosed in U.S. Pat. No. 3,899,326.

Plug means 8,11 can then be formed in the sintered monolith 1 by injecting a sinterable or other suitable sealant mixture into the appropriate ends of the cells 3. For example such mixture can be injected by means of a pressurized air actuated sealant gun whose nozzle can be positioned at the proper cell openings on the end faces 4,5 so as to extrude the mixture into and to plug the end portions of the cells. An appropriate assembly and positioning of an array of sealant nozzles of such gun(s) can be used to inject the plug mixture simultaneously in a plurality or all of the alternate cells at each face 4,5 for efficient production. Upon subsequent firing of the body 1 after having been plugged with a sinterable or other heat-setting mixture, there results rigidified closure masses 8,11 which are adherently bonded to adjacent portions of walls 2. These plugs 8,11 are substantially nonpermeable to the fluid to be passed through filter 1.

If so desired, the monolith 1 need not necessarily be fired or sintered before injecting sealant mixture, especially ceramic cement, into the ends of the cells 3. For example, monolith 1 can be made of ceramic material having a firing temperature that is substantially the same as or closely similar to the firing or foaming temperature of an appropriately selected ceramic cement. In that case, the cement can be injected into the cell ends while the monolith is in the unfired or greenware state. Thereafter the green monolith with green cement plugs is fired to suitable temperature or temperatures within the appropriate range to effect sintering of the monolith and of the cement (including foaming thereof if that is a characteristic of it).

Figure 2:
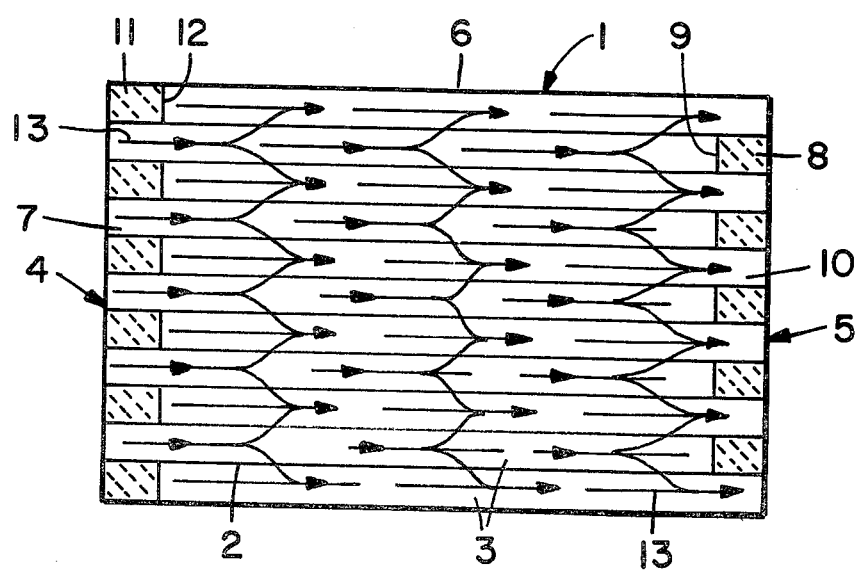
FIG. 2 is a sectional view taken in each plane indicated by each of the line and arrows A—A and the line and arrows B—B of FIG. 1.

FIG. 2 shows the pattern of fluid flow through filter 1 in both a vertical column of cells 3 (in plane A—A of FIG. 1) and a horizontal column of cells 3 (in plane B—B of FIG. 1). Fluid flow is indicated by the lines 13 with arrows. Thus, fluid 13 passes into inlet cells 7 from inlet end face 4, but because of the blocking effect of end faces 9 of plugs 8, the fluid under some pressure then passes through the pores or open porosity in cell walls 2 at top, bottom and both sides of the cells 7 so as to respectively enter outlet cells 10 above, below and on both sides of each cell 7. While fluid 13 passes through the entirety of all cell walls 2, their porosity is such as to restrain particulates therein and thereon as a porous accumulation (which may even fill up all of cells 7 before replacement of the filter 1). It can be seen that the entirety of all cell walls 2 act as filters for unique superior filter capability. The fluid 13 passing into cells 10 then flows out of these cells at the outlet end face 5, since the end faces 12 of plugs 11 adjacent the inlet end face 4 prevents the fluid from reversing direction. Also, plugs 11 prevent fluid 13 from directly entering cells 10 without first going into cells 7 and through walls 2.

While it is preferred to make the transverse cross-sectional geometry of the cells 3 to be squares as shown in FIG. 1, any other suitable geometries may be employed. Examples of such other geometries are equilateral triangles, right triangles, rhomboids, rhombuses, rectangles and a repeating pattern of other quadrilaterals. In each of these polygonal shapes, intersecting walls 2 preferably form included angles that are not less than 60° to avoid the nonuniform accumulation of particulates in smaller angle corners and to enable proper complete plugging of the alternate cells adjacent end faces 4,5. Also, it may be desirable for enhanced mechanical strength of the honeycomb filter bodies that the cell corners be filleted or slightly filled in with the same or similar material as forms cell walls 2. That latter concept can be extended to a presently lesser desirable form of circular transverse geometry. The walls 2 have a substantially uniform thickness throughout in that they substantially uniformly vary from their thinnest portions to their thicker (or maximum filleted) portions. Another alternative to the latter one would be eliptical transverse cell geometry. If it is desired for certain purposes, the filter body can be made with a plurality of transverse sectors (e.g. annular or pie/wedge shaped) whereby the transverse cell cross-sectional areas are larger in a sector or sectors than such areas are in another sector or other sectors. It is even conceivable that repeating patterns of different transverse geometric cell shapes can be employed in different transverse sectors.

In all variations of the filter body with respect to transverse cell geometry, alternate cells are plugged adjacent each end face in a checkered style pattern such that those cells plugged at the inlet end face are open at the outlet end face and vice versa. Also, the transverse cross-sectional areas of such cells are desirably sized to provide transverse cell densities in the range of about 2–93 cells/cm². Correspondingly, it is desirable to make the thin walls with thickness in the range of about 0.05–1.27 mm. Preferably the walls are at least about 0.3 mm. thick.

Figure 3:
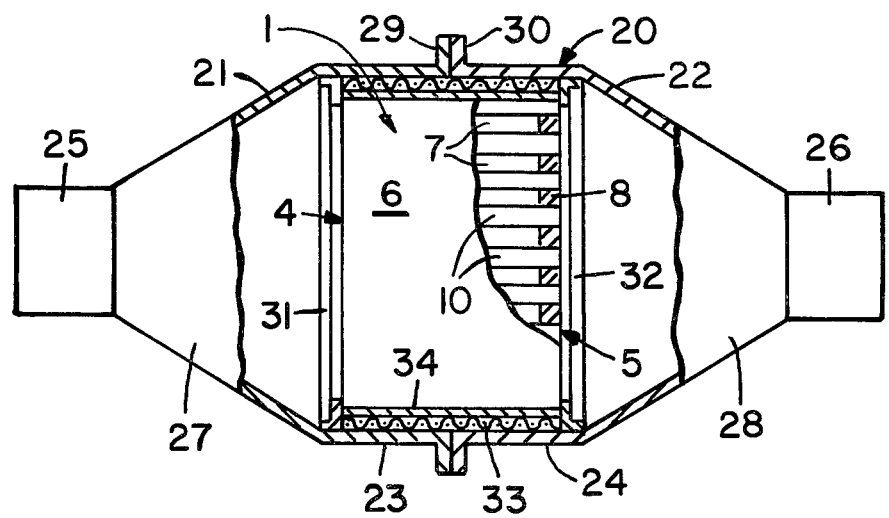
FIG. 3 is a longitudinal sectional view through a filter apparatus according to the present invention for filtration of particulates from diesel engine exhaust gas.

A preferred embodiment of the present invention is a filter apparatus for removing carbonaceous particulates from diesel engine exhaust gas so as to avoid air pollution by such particulates, which individually can range in size from about 5 micrometers down to and below 0.05 micrometer. FIG. 3 shows an exemplary form of such apparatus, which comprises the filter body 1 held within a container or can 20. Body 1 is the same as that shown in FIG. 1, with skin 6, inlet cells 7 extending from inlet end face 4 and blocked by plugs 8, and outlet cells 10 open at outlet end face 5. Can 20 is similar to a conventional type of can (see U.S. Pat. No. 3,441,381) employed for mounting catalytic converter honeycomb substrates in exhaust systems of internal combustion engines. The can 20 comprises two parts 21,22 respectively formed of filter-holding portions 23,24, conduit-connectors 25,26, conical portions 27,28 respectively joining connectors 25,26 to portions 23,24, and mating flanges 29,30 which are mechanically fastened together (e.g. by bolts and nuts not shown) to keep the can properly assembled for use and so as to be capable of being unfastened in order to open the can 20 for replacement of filter body 1. Internal annular mounting members 31,32 of L shaped cross-section are respectively fastened to portions 23,24 so as to respectively abut against faces 4,5 and hold body 1 in its proper fixed axial position within can 20. To cushion body 1 against mechanical shock and vibration, it is ordinarily desirable to surround body 1 with a wrapping or mat 33 of metal mesh, refractory fiber and the like, which may fill the annular space between body 1 and portions 23, 24. To minimize heat loss from body 1 and excessive heating of portions 23,24, a layer of insulating material 34, such as glass or mineral wool mat, may also be wrapped around body 1.

Connectors 25,26 are suitably fastened (e.g. by welding or gasketed mechanical coupling) to exhaust gas conduit of a diesel engine. While can 20 can be located in and form part of the exhaust gas conduit some distance downstream for the engine exhaust manifold, it can desirably be located near or at the exit from the exhaust manifold. The latter arrangement facilitates regeneration of filter body 1 by utilizing the higher temperature of the exhaust gas upon exiting the exhaust manifold to cause, with excess air in the gas, the combustion of carbonaceous particulates restrained in body 1 to form further gaseous combustion products that can then pass on through and out of body 1 for emission through connector 26 to the tailpipe (not shown) fastened to connector 26. If desirable (especially when can 20 is located downstream along the exhaust conduit some distance from the exhaust manifold), a combustion ignition device may be positioned in can 20, such as a glow plug in conical portion 27 or an electric heater within the central axis of body 1 (similar to the device of U.S. Pat. No. 3,768,982), and secondary air may be injected into can 20 upstream from body 1 to assist in regeneration of body 1 without removing it from can 20. Additionally, catalyst substance can be placed on and in walls 2 of body 1 (similar to catalytic converter honeycomb substrates) to facilitate regeneration combustion in body 1. In ordinary usage, frequent higher speed or rpm of the diesel engine can contribute sufficient heat (e.g. 400°–500° C. or higher) to cause repetitive regeneration combustion of body 1 without requiring the can 20 to be opened often for replacement of body 1. Nevertheless, removed bodies 1 can be reverse flushed with air to blow much of the particulates out of it into a collector bag and then fully regenerated by high temperature air passed through it before reinstalling in can 20.

Examples

Cordierite ceramic materials of the type disclosed in U.S. Pat. Nos. 3,885,977 and 4,001,028 are generally preferred for diesel particulate trap filters because, as was earlier found for their use as catalyst substrates in internal combustion engine exhaust systems, these materials have properties that enable them to withstand and be durable under the thermal, chemical and physical conditions to which they are subjected in such systems including those of diesel engines. A series of filter honeycomb samples with square cross-section cells were extruded of cordierite batch compositions as set forth in TABLE 1. Those samples were then dried and fired generally in accordance with the following typical firing schedule:

TABLE I

Batch Compositions - weight % of total ceramic & graphite raw materials

| Raw Materials[a] | Samples | | | | | |
|---|---|---|---|---|---|---|
| | A | B-C | D-E-F-G-H | I-J-K | L-M | N |
| Georgia-Kaolin Hydrite MP Clay (APS 9.7) | 25.15 | 20.96 | 19.31 | 20.96 | 20.96 | 19.70 |
| Georgia-Kaolin Glomax LL Clay (APS 1.9) | 21.17 | 17.64 | 16.35 | 17.64 | 17.64 | 16.58 |
| Pfizer MP 96-28 Talc (APS 20) | 40.21 | 33.51 | 30.85 | 33.51[d] | 33.51[e] | 31.49 |
| Alcoa A-2 Alumina (APS 5.8) | 13.47 | 11.22 | 10.46 | 11.22 | 11.22 | 10.54 |
| Asbury 4012 graphite[b] | — | 16.67 | 23.03 | 16.67 | 16.67 | — |
| Asbury A-99 graphite[c] | — | — | — | — | — | 21.69 |
| Methyl cellulose binder/plasticizer | 4.0 | 4.0 | 4.0 | 4.0 | 4.0 | 4.0 |
| Alkali sterate extrusion aid | 0.5 | 0.5 | 0.5 | 0.5 | 0.5 | 0.5 |
| Distilled water plasticizer | 32.5 | 31.0 | 30.5 | 26.5 | 28.0 | 34.0 |

[a] APS means average particle size in micrometers
[b] Particle size (wt. %): 1.4% +120 mesh, 21.1% −120+140 mesh, 63.9% −140+200 mesh, 13.6% −200 mesh (U.S. Std. Sieve)
[c] Particle size (wt. %): 97% −325 mesh (U.S. Std. Sieve)
[d] Only +150 mesh (U.S. Std. Sieve) screened fraction
[e] 50 wt. % unscreened portion plus 50 wt. % +150 mesh (U.S. Std. Sieve) screened fraction.

80° C. to 1425° C. within about 60 hours.
Hold about 10 hours at 1425° C.
Cool 1425° C. to room temperature within about 24 hours.

The walls of the as-fired samples had typical open porosity and mean pore diameters as set forth in TABLE 2, which varied among the samples with particular relation to variation in the graphite (as burn-out material) and talc used in the batch compositions.

TABLE 2

| Samples | Open Porosity volume % | Mean Pore Diameter micrometers |
|---|---|---|
| A | 35 | 4 |
| B | 44.5 | 9 |
| C | 41.3 | 10 |
| D | 48.0 | 11 |
| E | 48.5 | 13 |
| F | 47.7 | 13 |
| G | 46.8 | 12 |
| H | 65.6 | 11 |
| I | 65.8 | 15 |
| J | 38.8 | 35 |
| K | 37.2 | 35 |
| L | 36.7 | 23 |
| M | 44.7 | 22 |
| N | 54.6 | 6 |

Plugs were formed in the end portions of alternate cells, as previously described, of the sintered samples by injecting a plastically formable ceramic cement into such cell ends with an air-operated sealant gun. The amount of plugging cement injected into the cell ends was controlled by measuring the time that operative air pressure was applied to the sealant gun. By this means, the cement plugs were generally made with a depth or length into the cell from an end face thereof in the range of about 9.5–13 mm.

A preferred plugging cement employed with the foregoing samples was of the manganese-magnesium cordierite foam type described and claimed in copending application Ser. No. 165,647, entitled CERAMIC FOAM CEMENT, which was filed by Robert J. Paisley on the same date as this application and is assigned to the assignee of this application. The broader scope of cement in that application is incorporated herein by reference. In particular, the preferred foam cement used in the above-noted samples had the following batch composition (in weight % of the total of the first four cordierite-forming ingredients):

Georgia-Kaolin Kaopaque 10 clay (APS 10)—57.57
Penn. Glass Sand Minusil silica (APS 5)—7.04
Baker reagent $MnCO_3$ powder—25.39
Mn-Mg cordierite grog (−325 mesh)—10.00
Norton RA600 SiC (600 grit)—1.0
Methyl cellulose binder/plasticizer—2.0
Distilled water plasticizer—70.0

The previously fired samples with the injected cement plugs were then fired generally in accordance with the following. The Mn-Mg cordierite grog in the cement batch was a dense ceramic product of the type described and claimed in copending application Ser. No. 165,611 of Irwin M. Lachman and entitled DENSE CORDIERITE CONTAINING MANGANESE, which was filed on the same date as this application and is assigned to the assignee of this application. In particular, the grog was made of the following batch composition (in weight % of the total ceramic raw materials):

Sample A grog (−200 mesh)—84.48
Georgia-Kaolin Kaopaque 10 clay (APS 10)—10.00
Baker $MnCO_3$ powder—4.15
Penn. Glass Sand Minusil silica (APS 5)—0.78
Pfizer MP 96-28 talc (APS 20)—0.59
Methyl cellulose binder/plasticizer—4.0
Alkali stearate extrusion aid—0.5
Distilled water plasticizer—26.0

This Mn-Mg cordierite grog was fired generally in accordance with the same firing schedule as for Sample A, except that the maximum temperature was 1405° C. instead of 1425° C.

The previously fired samples with the injected cement plugs, as noted above, were fired generally in accordance with the following typical firing schedule:
Room temperature to 1210° C. within about 6 hours.
Hold about 30 minutes at 1210° C.
Cool 1210° C. to room temperature within about 18 hours.

The cement foamed during firing to develop good sealing to the cell walls and generally fluid impervious plugs. The foaming action counteracts normal drying and firing shrinkage of an otherwise nonfoaming ceramic cement.

While the previously mentioned foam cement is preferred for forming the plugs, other suitable foaming and nonfoaming ceramic cements may be used. Even non-ceramic cements or sealants may be used if they are capable of being durable under exhaust system conditions of heat as well as chemical and physical abuse.

The filter samples made as described above, and having various cell densities, wall thicknesses and external dimensions (diameter and length), were tested in the exhaust system of a 1980 Oldsmobile 350 CID (cubic inch displacement) diesel V-8 engine operated with a water brake dynamometer at constant conditions of speed and load. A driveshaft speed of 1000 rpm was used, which was equivalent to a vehicle road speed of 40 mph (64 km per hr.). A load of 100 ft-lbs (approx. 136 joules) torque was used, which was equivalent to higher than basic vehicle road load at steady 40 mph (64 km per hr) speed on a horizontally level road surface. This higher than basic road load provided more realistic exhaust particulates volume per unit time with respect to the fact that actual or commonly experienced road loads are ordinarily higher than basic road loads because of fluctuations in acceleration and variations in road surfaces from the level condition. The engine was warmed up to normal operating temperature before beginning the tests of the filter samples.

The filter cans were located about 2.1 meters downstream from the engine exhaust manifold. Exhaust gas flow rate through each filter placed in the can (from only four engine cylinders) was approximately constant in the range of about 1.0–1.1 cubic meters per minute. Back pressures caused by (or pressure drops across) the filter samples were measured by water manometer and were monitored during the tests from an initial level up to the time they rose to 140 cm. of water, at which time the tests were discontinued because higher back pressure has been determined by the engine manufacturer to be unacceptable for proper engine operation. Thus, when the pressure drop across the filter reaches 140 cm. of water, the filter has attained its maximum effective filter capacity in a single operation in the noted system. The total time from the beginning of the test (with the exhaust gas started through the filter) until the filter back pressure becomes 140 cm. of water is referred to as the Operating Time of the filter.

Exhaust gas samples were taken downstream of the filter can. Without any filter in the can, the amount of particulates in the total unfiltered exhaust gas (in terms of grams per mile or g/mi.) were calculated from the amount of particulates measured in an unfiltered gas sample. This amount of particulates—called the Baseline Particulates—was found to have negligible variation over a range of back pressures exerted on the system up to 140 cm. of water. The Baseline Particulates ranged between 0.17 g/mi. and 0.24 g/mi. in the various tests. With a filter in the can, the amount of Residual Particulates in the total filtered exhaust gas (in terms of g./mi.) were calculated from the amount of particulates measured in a filtered gas sample. The difference between the Baseline Particulates and the Residual Particulates as a percent of the Baseline Particulates is referred to as the calculated Filter Efficiency. Incidentally, the Filter Efficiency in terms of the weight gain of the filter during a test (i.e. the gain over the initial untested filter weight) as a percent of the Baseline Particulates for the same test agreed closely with the above-noted calculated Filter Efficiency.

TABLE 3 sets forth the initial pressure drop, Operating Time and Filter Efficiency for a series of tested filter samples having a square cell density of 15.5 cells/cm$^2$, external dimensions of about 9.3 cm. diameter and 30.5 cm. length, and wall thicknesses as indicated in that table. In most cases for a given wall thickness, two filters of the same sample honeycomb body were tested.

TABLE 3

| Wall Thickness mm. | 0.305 | 0.432 | 0.635 |
|---|---|---|---|
| Initial Pressure Drop (cm. of water) | | | |
| Sample B | 30.2/14.2 | 35.0/34.5 | 39.8/34.5 |
| Sample D | 29.4/24.8 | 28.2 | 40.5/29.7 |
| Sample H | 24.6/20.9 | 20.0/16.3 | 30.1 |
| Sample I | — | 11.6/10.0 | — |
| Sample J | 6.2/7.3 | — | 15.7/16.8 |
| Sample K | 8.1/8.0 | 9.5/9.9 | 17.4/17.6 |
| Sample L | 12.7 | 19.0/17.2 | 24.0/21.3 |
| Sample M | 11.0/11.7 | 29.0/23.7 | 23.4/21.7 |
| Sample N | 20.8/23.7 | — | 28.6/27.9 |
| Operating Time (hours) | | | |
| Sample C | 2.01/2.20 | 2.39/2.04 | 1.18/1.48 |
| Sample D | 3.40/3.8 | 3.17 | 1.89/2.3 |
| Sample H | 3.60/5.0 | 3.20/4.30 | 3.30 |
| Sample I | — | 4.50/4.90 | — |
| Sample J | 18.00/16.6 | — | 5.90/4.30 |
| Sample K | 8.80/11.3 | 5.40/5.70 | 2.17/3.00 |
| Sample L | 6.00 | 1.80/2.16 | 1.32/1.55 |
| Sample M | 7.80/8.50 | 2.67/3.00 | 1.39/1.78 |
| Sample N | 3.50/3.60 | 3.00/3.30 | 2.40/2.60 |
| Filter Efficiency (%) | | | |
| Sample B | — | 91.3/95.0 | — |
| Sample C | 95.9/96.0 | 95.8/97.8 | 97.0/88.2 |
| Sample D | 94.6/95.3 | 96.0 | 94.6/95.0 |
| Sample H | 84.3/80.9 | 86.8/89.0 | 87.0 |
| Sample I | — | 69.7/60.1 | — |
| Sample J | 51.2/41.3 | — | 64.0/62.6 |
| Sample K | 57.5/46.4 | 66.8/62.3 | 78.1/77.6 |
| Sample L | 67.8 | 85.8/86.1 | 85.3/89.4 |
| Sample M | 66.8/70.3 | 87.0/84.9 | 88.4/87.6 |
| Sample N | 96.3/96.2 | 98.0/97.0 | 98.3/98.8 |

From the foregoing tests and their resultant data in TABLE 3, it can be seen that the samples of the present invention (i.e. Samples D, H and N within the broad area 1-2-3-4 and also within the preferred area 1-5-6-4) provide the unique superior combination of average Filter Efficiency of at least 75% and a minimum average Operating Time of three hours (except for Samples D and N with wall thickness of 0.635 mm). The other samples outside the present invention can be seen to be notably deficient in one or the other of these two important characteristics. Areas 1-2-3-4 and 1-5-6-4 are represented by the boundary lines connecting those numbered points with coordinate values as follows:

| Point | Coordinates Open Porosity % | Mean Pore Diameter μm |
|---|---|---|
| 1 | 58.5 | 1 |
| 2 | 33.0 | 20 |
| 3 | 52.5 | 20 |
| 4 | 90.0 | 1 |
| 5 | 39.5 | 15 |
| 6 | 62.0 | 15 |

Thus, the filters of the present invention, desirable for diesel exhaust systems, have a novel optimum balance of open porosity and mean pore diameter.

The preceding test data also show a tendency for reduced Operating Time when maximizing Filter Efficiency in filters of a given external size and cell density. However, it has been found that Operating Time is directly proportional to the filter surface area. To avoid compromise of Filter Efficiency, Operating Time can be increased by increasing cell density and/or external size.

Figure 4:
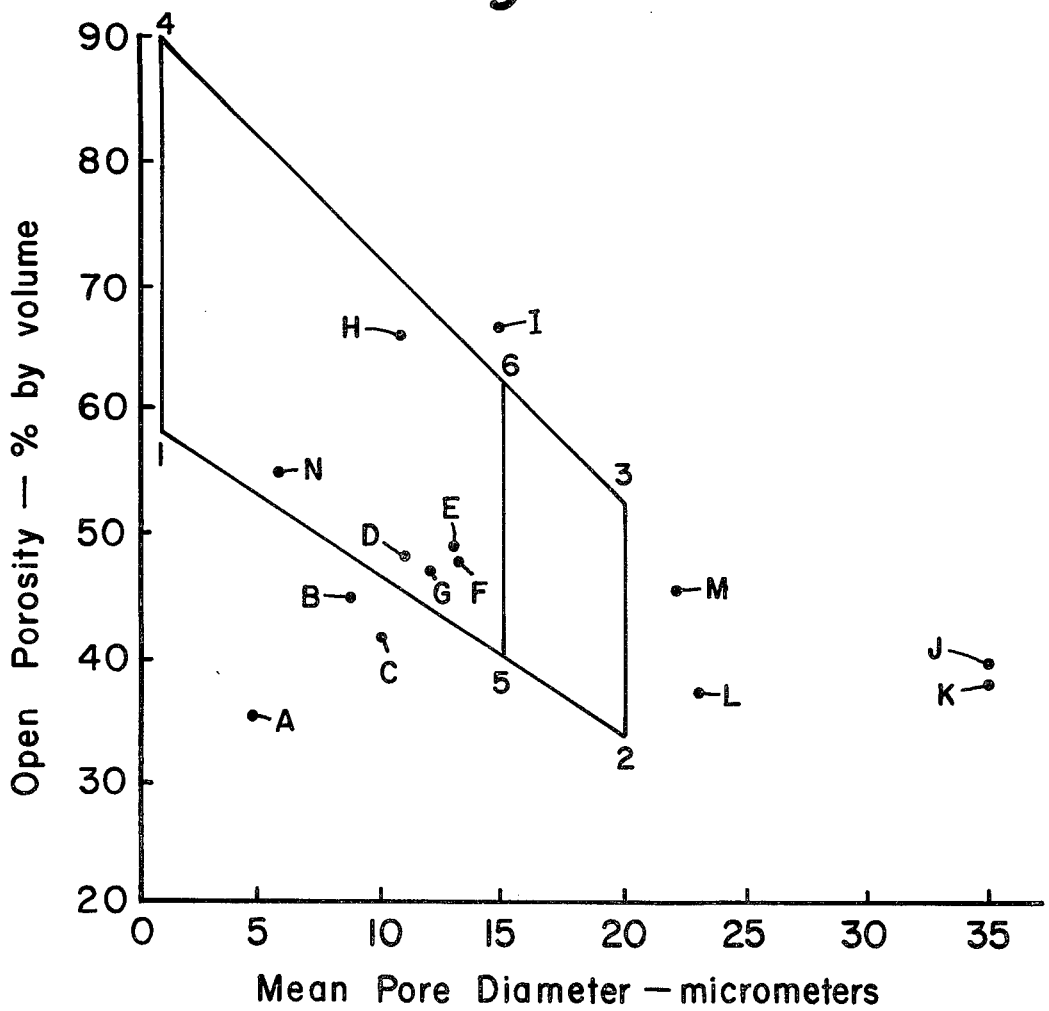
FIG. 4 is a graphical representation of the combined open porosity and mean pore size of filters according to the present invention and that of the aforesaid related application. The unique combinations of open porosity and mean pore size of the present invention lie solely within area 1-2-3-4, while the other filters with open porosity/pore size combinations lying outside of area 1-2-3-4 are examples of the earlier invention in the aforesaid related application.

The test data of TABLE 4 (derived from the same test previously described) illustrate the effect of increasing cell density and of increasing external size on Operating Time of the filters with wall thickness of 0.305 mm and a diameter of about 9.3 cm. Typical initial back pressures of those filters with square cell densities of 31 and 46.5 cells/cm$^2$ were respectively 14.1/10.5 and 15.7 cm. of water. Like Sample D, Samples E and F also are within the present invention as indicated by FIG. 4. While no actual test data was obtained for a Sample F filter with more than 1 m$^2$ of filter surface area, it is evident from the presented data that such larger Sample F filter would have an Operating Time in excess of three hours.

TABLE 4

| Sample | Cell Density cells/cm$^2$ | Filter Length cm | Filter Surface Area m$^2$ | Filter Efficiency % | Operating Time hours |
|---|---|---|---|---|---|
| D | 15.5 | 15.2 | 0.63 | 94.9* | 0.65* |
| E | 31.0 | 15.2 | 0.74 | 94.9 | 1.67 |
| F | 46.5 | 15.2 | 0.98 | 91.8 | 2.43 |
| D | 15.5 | 30.5 | 1.34 | 95.0* | 3.6* |
| E | 31.0 | 30.5 | 1.79 | 95.2 | 5.0 |

*Average of two tests

A further illustration of larger filter surface area providing greater Operating Time is the test results with a Sample D filter having a square cell density of 15.5 cells/cm$^2$, a diameter of about 14.4 cm, a length of about 30.5 cm and wall thickness of about 0.432 mm. Its filter surface area was 3.03 m$^2$. The filter had an initial back pressure of 3.0 cm of water. It exhibited a Filter Efficiency of 79% and an Operating Time of 23.1 hours.

The tested filter samples were examined for the condition of accumulated particulates that generally completely filled such filters. No significant differences in the amount of particulates were seen with respect to varying radial and axially positions in the filters. These results are believed to be in significant part due to lack of lower angle corners in the geometric transverse square shapes of the cells in those filter samples. Further, the packed densities of the accumulated particulates were estimated to be relatively constant throughout the filter samples—being in the range of 0.05–0.06 g/cm$^3$ for samples with about 9.3 cm diameter and 30.5 cm length and about 0.09 g/cm$^3$ for the sample with about 14.4 cm diameter and 30.5 cm length.

Moreover, it was observed that the accumulation of particulates in the filter samples has a three-stage effect on filter pressure drop. The first stage involves a fairly substantial steady rise in pressure drop. It is followed by a second stage during which the pressure drop rises at a much lower rate. Finally in a third stage (apparently when fluid flow paths through the accumulated particulates are being fully blocked), the rise in pressure drop accelerates again to a much higher rate. All three stages can usually be observed in the larger samples with 14.4 cm diameter and 30.5 cm length. However, the smaller samples often showed only either the first and second stages or the first stage before the pressure drop reached 140 cm of water.

The effects of lower cell density were demonstrated with Samples G of filters having square cell density of about 7.75 cells/cm$^2$ and wall thickness of about 0.635 mm. Their approximate external dimensions and test results are set forth in TABLE 5. Those results show that lower cell density tends to decrease Operating Time because of lower filter surface area, but that such tendency can be offset by employing larger external dimensions. As indicated in FIG. 4, Sample G is also within the present invention.

TABLE 5

| Diameter cm | Length cm | Filter Efficiency-% | Operating Time-hours |
|---|---|---|---|
| 9.3 | 30.5 | 95.0 | 1.35 |
| 9.3 | 30.5 | 96.4 | 1.73 |
| 14.4 | 29.8 | 93.3 | 14.7 |

A Sample A filter was also made with cell density of about 7.75 cells/cm$^2$, wall thickness of about 0.635 mm, diameter of about 14.9 cm and length of about 17.8 cm. It had a fairly high initial pressure drop indicative of providing too little Operating Time in comparison to the present invention.

We claim:

1. Apparatus for filtering solid particulates from suspension in fluid streams such as exhaust gas from diesel engines, which comprises a filter of honeycomb structure having
   a matrix of thin porous walls defining a plurality of cells extending longitudinally and mutually parallel therethrough between inlet and outlet end faces of the structure,
   the walls containing substantially uniform interconnected open porosity of a volume and size sufficient to enable the fluid to flow completely through the walls and to restrain most or all of the particulates from passing completely through the walls,
   the transverse cross-sectional shapes of the cells forming a substantially uniformly repeating pattern of geometric shapes without interior corner angles of less than 30°,
   an inlet group of the cells open at the inlet end face and closed adjacent to the outlet end face,
   an outlet group of the cells closed adjacent to the inlet end face and open at the outlet end face,
   each cell of the inlet group sharing cell walls only with cells of the outlet group and
   each cell of the outlet group sharing cell walls only with cells of the inlet group,
   wherein the improvement comprises
   the volume of interconnected open porosity and the mean pore diameter of the pores forming the open porosity lying within the area defined by the boundary lines connecting points 1-2-3-4 in FIG. 4.

2. Apparatus of claim 1 wherein the walls within each transverse sector of the structure have substantially uniform thickness.

3. Apparatus of claim 1 wherein the walls throughout the structure have a substantially uniform thickness.

4. Apparatus of claim 1 wherein the transverse cross-sectional geometric shapes of the cells are quadrilaterals.

5. Apparatus of claim 4 wherein the geometric shapes are squares.

6. Apparatus of claim 1 wherein
   the walls are not greater than about 1.5 mm thick,
   the volume of interconnected open porosity and the mean pore diameter of the pores forming the open porosity lie within the area defined by the boundary lines connecting points 1-5-6-4 in FIG. 4, and
   the structure has a transverse cross-sectional cell density of at least about 1.5 cells/cm$^2$.

7. Apparatus of claim 6 wherein the walls have a thickness in the range of about 0.05–1.27 mm. and the cell density is in the range of about 2–93 cells/cm$^2$.

8. Apparatus of claim 7 wherein the walls are not less than about 0.3 mm. thick.

9. Apparatus of claim 8 wherein the walls are not greater than about 0.635 mm thick.

10. Apparatus of claim 9 wherein the cell density is at least about 7.75 cells/cm$^2$.

11. Apparatus of claim 10 wherein the geometric shapes of the cells are squares.

12. Apparatus of claim 10 wherein the geometric shapes of the cells are triangles.

13. Apparatus of claim 1 including
    a diesel engine exhaust gas conduit, and
    a portion of the conduit comprising a housing containing the filter interposed across the exhaust gas path through the housing with the inlet end face of the filter facing upstream of the gas path.

14. Apparatus of claim 13 wherein
    the walls throughout the structure having a substantially uniform thickness of not greater than about 1.5 mm,
    the transverse cross-sectional geometric shapes of the cells are squares,
    the volume of interconnected open porosity and the mean pore diameter of the pores forming the open porosity lie within the area defined by the boundary lines connecting points 1-5-6-4 in FIG. 4, and
    the structure has a transverse cross-sectional cell density of at least about 1.5 cells/cm$^2$.

15. Apparatus of claim 14 wherein the walls have a thickness in the range of about 0.05–1.27 mm. and the cell density is in the range of about 2–93 cells/cm$^2$.

16. Apparatus of claim 15 wherein the walls have a thickness in the range of about 0.3–0.635 mm. and the cell density is at least about 7.75 cells/cm$^2$.

17. Apparatus of claim 1 or 13 wherein the filter is fabricated of ceramic material.

18. Apparatus of claim 1 wherein the transverse cross-sectional geometric shapes of the cells are triangles.

19. Apparatus of claim 13 wherein
    the walls throughout the structure have a substantially uniform thickness of not greater than about 1.5 mm,
    the transverse cross-sectional geometric shapes of the cells are triangles,
    the volume of interconnected open porosity and the mean pore diameter of the pores forming the open porosity lie within the area defined by the boundary lines connecting points 1-5-6-4 in FIG. 4, and
    the structure has a transverse cross-sectional cell density of at least about 1.5 cells/cm$^2$.

* * * * *